April 22, 1947.　　W. H. KLIEVER ET AL　　2,419,266
ELECTRONIC CIRCUIT FOR INDICATING ICE FORMATION
Filed Oct. 24, 1942　　2 Sheets-Sheet 1
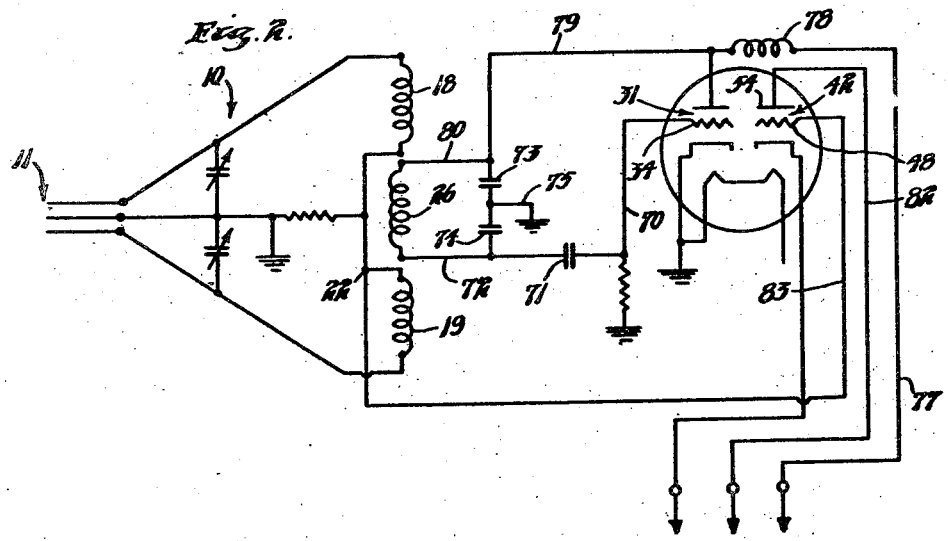
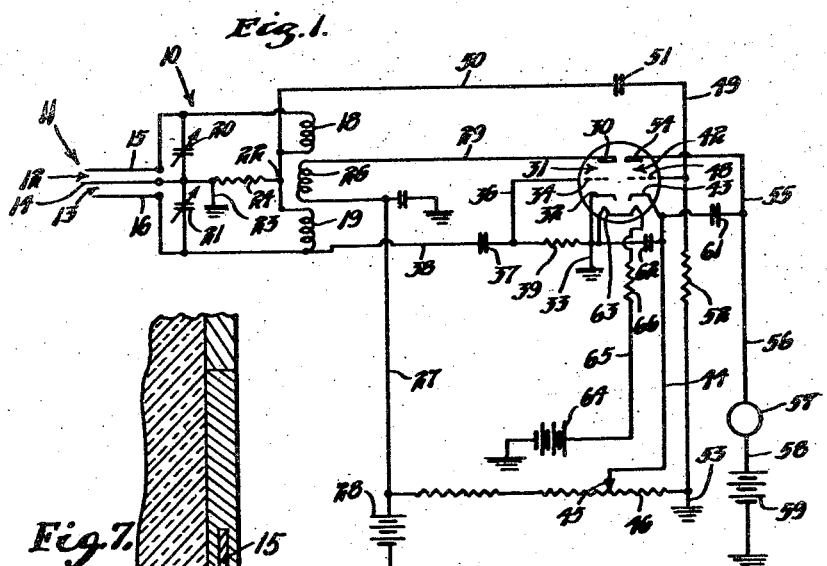
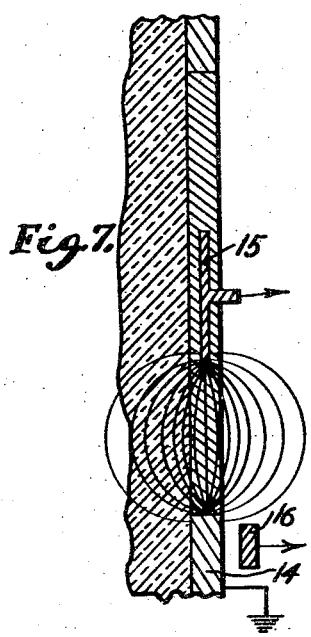
Inventors
WALDO H. KLIEVER.
RICHARD M. FRANZEL.
George H. Fisher
Attorney

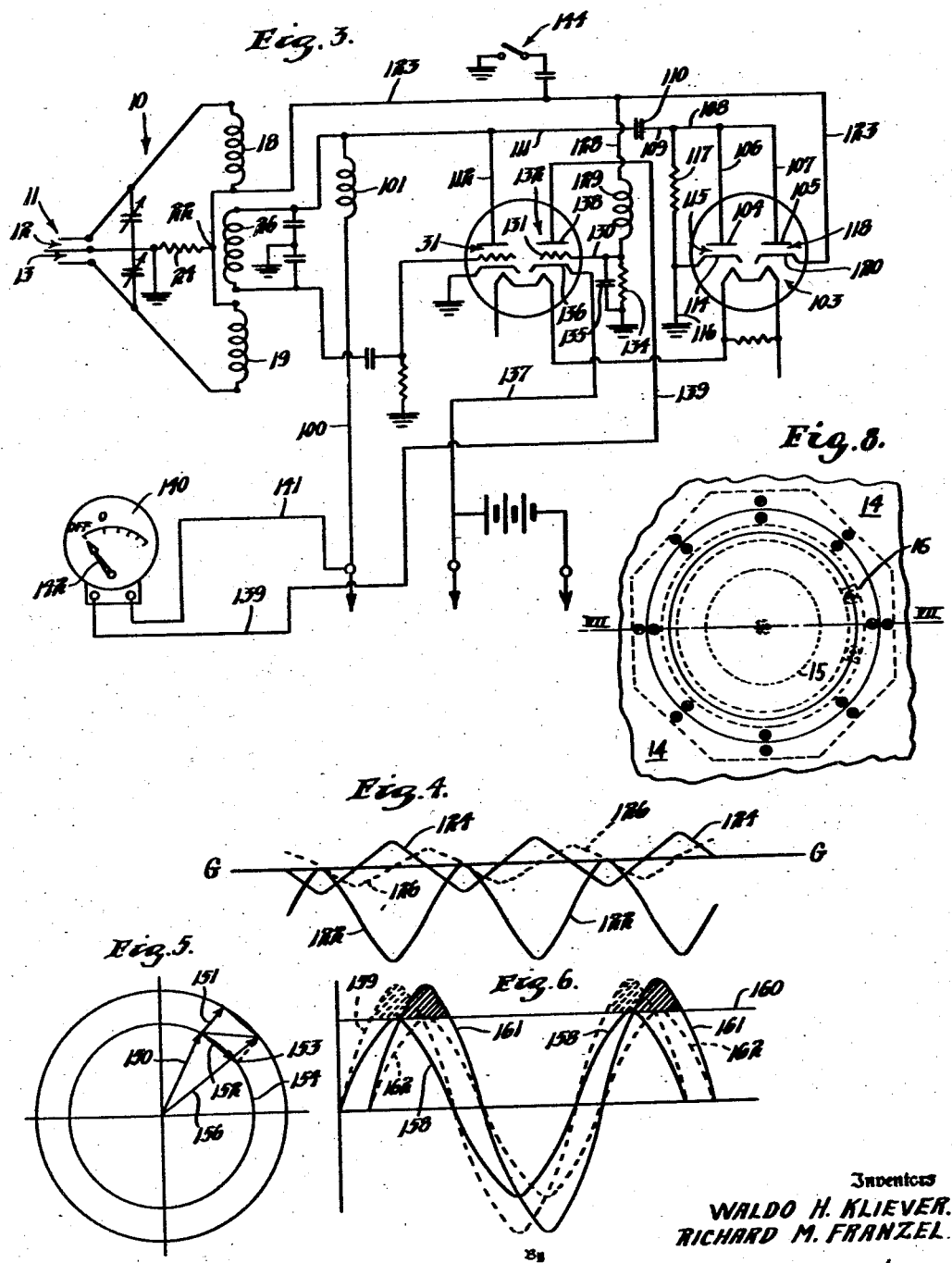

Patented Apr. 22, 1947

2,419,266

UNITED STATES PATENT OFFICE 2,419,266

ELECTRONIC CIRCUIT FOR INDICATING ICE FORMATION

Waldo H. Kliever and Richard M. Franzel, Minneapolis, Minn., assignors to Minneapolis-Honeywell Regulator Company, Minneapolis, Minn., a corporation of Delaware Application October 24, 1942, Serial No. 463,260

17 Claims. (Cl. 177—311)

This invention is directed broadly to electronic circuits and more particularly to circuits which measure the amount of unbalance of an impedance bridge.

One of the primary objects of the present invention is to employ a pair of triodes, which may either be in the form of separate tubes or in the form of a twin triode tube, one of the triodes being used as an oscillator for causing a flow of alternating current in an impedance bridge, and the other of the triodes being used to detect and amplify the effect caused by unbalance of the impedance bridge.

Another object of the invention is to provide an electronic system having a combined impedance bridge and oscillator circuit which is powered inductively by means of an oscillator tube and coil, in which the feedback connection to the grid of the oscillator tube is connected to the coil, rather than the bridge itself.

A still further object of the invention is to provide an electronic system which will respond to the unbalance of an impedance bridge, where the unbalance is caused by variations in a condition which produce a bridge voltage of one particular wave form, and which does not respond to the unbalance of the same bridge where this unbalance is caused by a second condition which produces a bridge voltage which differs from the original bridge voltage by a phase angle of approximately 90 degrees. In other words, the present system will detect the difference in phase between the bridge voltages caused by unbalance of the bridge and will respond to and amplify the effect of that voltage which is in the proper phase relationship with respect to the detector, and will not respond to voltages which are approximately ninety degrees or less out of phase therewith.

Although the present system is of general application, it was designed specifically for use in connection with an ice indicator employing a pick-up unit of the capacitor type as disclosed in the co-pending application of Waldo H. Kliever, Serial No. 463,259, and filed on even date herewith. Where this system is used in combination with the pick-up unit of an ice indicator, it is contemplated that the detector will detect and amplify the bridge voltages resulting from a change in the capacitance of the pick-up condenser due to the dielectric effect of ice formed thereon, but will not respond to bridge unbalance caused by the effect of the conductance of the ice, the latter effect producing a bridge voltage which is 90 degrees out of phase with the voltage caused by variation in the capacitance of the condenser.

A further object of the invention is to so adjust the system that the detector tube will respond negatively in a slight degree to the bridge unbalance caused by the conductance of the ice in order that this response may compensate for the effect of temperature upon the dielectric constant of the ice.

These and other objects of the invention will readily become apparent as the following specification is read in the light of the accompanying drawings, in which:

Figure 1 is a diagrammatic representation of a circuit incorporating various features of our invention;

Figure 2 is a diagrammatic view of a slightly modified circuit;

Figure 3 is a diagrammatic showing of a further modification of our invention which incorporates a means for detecting the unbalance of an impedance bridge in one particular phase but which will not detect bridge unbalance in a different phase;

Figure 4 is a view showing curves which serve to illustrate the operation of the system of Figure 3;

Figure 5 is a vector diagram illustrative of certain voltage relationships in our device, Figure 6 is a sketch illustrative of the wave forms corresponding to the various vector voltages of Figure 5, Figure 7 is a diagrammatic sectional view of a pickup unit suitable for use in an embodiment of our invention, taken along the line VII—VII of Figure 8, and Figure 8 is an elevation of an actual pick-up unit such as that shown in section in Figure 7.

For the purposes of illustration, the various electronic circuits forming our present invention will be described in connection with an ice indicator utilizing a pick-up unit which may be of the type disclosed in the aforementioned Kliever application.

It will be understood that our circuits are applicable generally and that the balance of the impedance bridge may be varied in many other ways than by the formation of ice upon a pick-up unit. It is also pointed out that the balance of the impedance bridge may be varied not only by varying the capacity of one of the condensers but also by varying the inductance of one of the inductance coils.

Referring now to Figure 1 of the drawings, the reference numeral 11 indicates generally a pickup unit of an ice indicator as disclosed in the aforementioned Kliever application. This unit comprises an ice responsive condenser 12 and a temperature compensating condenser 13. These two condensers have a common plate 14 which is grounded and the condenser 12 has a second condenser plate 15 which is insulated from the ice, but so positioned that the formation of ice on the pick-up unit varies the mean dielectric constant of the space between the plates 14 and 15 and hence varies the capacity of the condenser 12 in response to the thickness of the ice formation. The condenser 13 has a second condenser plate 16 so located as to be unaffected by ice formation. The purpose of the condenser 13 is to compensate the first condenser 12 for the effect which variations in temperature will have upon its capacity. The unit 11 as a whole varies the capacity of the circuit in accordance with the thickness of the ice formation on the pick-up unit.

Figures 7 and 8 are illustrative of one embodiment of such a pickup. As is shown in Figure 8, the pickup unit is installed in the metallic airfoil surface of a craft, and the common electrode of the pair of condensers is provided by this metallic airfoil surface. In the airfoil surface an aperture is provided and mounted in this aperture is a disk of dielectric material having imbedded in its center a second electrode 15. It will be observed that electrodes 14 and 15 comprising a first condenser are in edge to edge relation rather than in face to face relation.

A second electrode 16 is arranged for face to face cooperation with electrode 14, the dielectric in this case being air. The effective areas of the two condensers are so chosen with respect to the several dielectrics that change in the capacitance of one condenser due to a change in temperature is offset in an electric circuit later to be described by an equivalent change in the capacitance of the other condenser.

In Figure 7 are shown lines of electrostatic potential between the plates 15 and 14. The left hand portion of this figure is also shown as being covered with an accretion of ice, and it will be perceived that a portion of the electrostatic stress set up by potential difference across the plates of the condenser is exerted in the ice. Since the dielectric constant of ice is different from that of air, the accretion of ice on the surface of the pickup changes the capacitance of the condenser.

Since the presence of ice on the outer surface of the pickup alters the effective dielectric constant of the condenser, it also follows that the dielectric loss or conductance effect of the condenser is also varied. However, it will be observed that the condenser comprised of plates 14 and 16 is protected from accretion of ice, and therefore the capacitance of this condenser varies only with the temperature.

The two condensers 12 and 13 form a portion of an impedance bridge which is completed by the two inductance coils 18 and 19 and the two trimmer condensers 20 and 21. The point 22 between the two inductance coils 18 and 19 is grounded as shown at 23 through the resistance 24. When the impedance bridge is balanced, the potential of the point 22 will remain at zero but as the impedance bridge is unbalanced the potential of this point will vary above and below ground potential due to an alternating current flowing through the bridge, these variations of potential forming substantially a sine wave. The impedance bridge is powered from a coil 26 which is connected by means of the conductor 27 to some suitable source of D. C. potential such as the battery 28. The other end of the coil 26 is connected by means of the conductor 29 to the plate 30 of a triode indicated generally at 31. The cathode 32 of the triode 31 is grounded as shown at 33 and the control grid 34 is connected to the lower end of the inductance coil 19 of the impedance bridge by means of conductor 36, condenser 37 and conductor 38.

It will be clear from the above description that the impedance bridge circuit acts as a tank circuit of an oscillator which includes the triode 31, the conductors 38 and 36 and condenser 37 comprising the feedback connection to the control grid 34. The control grid 34 of the triode 31 is also provided with a grid leak resistor 39.

The detector is in the form of a triode which is indicated generally at 42. Actually, these two triodes are both located in the same tube and are in the form of a twin triode. It is clear that if desired two separate triode tubes may be used. The triode 42 is provided with a cathode 43 which is connected by means of a conductor 44 to a slider 45 which cooperates with a resistance 46. The slider 45 and the resistance 46 act as a voltage divider for determining and adjusting the bias voltage between the cathode 43 and a control grid 48. The control grid 48 is connected to the point 22 of the impedance bridge by means of conductors 49 and 50 and the condenser 51. The control grid 48 is also connected by means of the grid leak resistor 52 to ground as indicated at 53. The plate 54 is connected by means of conductors 55 and 56 to a device 57 which either may be an indicator for indicating the current flow through the triode 42 or may be a control device for a signal or, if desired, for operating a de-icer. The conductor 58 connects with a source of plate voltage 59. A filtering condenser 61 is located between the junction of conductors 55 and 56 and the cathode 43 and a second filtering condenser 62 is located between the conductor 44 and the cathode 32. A pair of cathode heaters 63 are supplied with power from a source of D. C. potential 64 through the conductor 65 and limiting resistor 66, the circuit being completed through ground at 33 after passing through the heaters 63.

From the above description, it will be obvious that the impedance bridge and triode 31 when connected to the source of power 28 will act as an oscillator and produce alternating current in the impedance bridge. When the bridge is exactly balanced, the potential at the point 22 will remain constant and therefore there will be no signal upon the control grid 48 of the detecting triode 42. Due to the relationship between the grid voltage and the plate current of the detector 42, it is desirable to have a small flow of current through this tube when there is no ice present on the pick-up unit 11. This can be accomplished by having the bridge slightly out of balance when there is no ice present on the pick-up unit or by biasing the detector 42 in a proper manner, or it can be accomplished by a combination of the two. In any event, the detector 42 is biased to a point near cut-off so that when the bridge is unbalanced and the potential at the point 22 varies, the detector 42 will transmit a pulsating direct current, the value of which is substantially proportional to the amount of unbalance of the impedance bridge. Thus, if the unit 57 is an indicator, this unit may be made to indicate the amount of unbalance of the bridge and the scale can be so calibrated as to indicate the amount of ice formed on the pick-up unit.

Referring now to Figure 2, a modified form of electronic circuit arrangement has been shown. This circuit arrangement however includes the same impedance bridge 10 and the same triode 31. In this circuit however, the feedback connection for the control grid 34 extends through conductor 70, condenser 71 and conductor 72 to the lower end of the coil 26 rather than to the lower end of the coil 19 as in Figure 1. A pair of condensers 73 and 74 are connected in parallel with the coil 26 and are grounded by means of the conductor 75 which extends between the two condensers. The two coils 18 and 19 are coupled rather closely to the coil 26 however, and here as in the circuit shown in Figure 1 the impedance bridge 10 also acts in conjunction with the coil 26 and triode 31 to form an oscillator. Thus here as in Figure 1, the circuit 10 functions both as an impedance bridge and as an oscillator.

The conductor 77 extends from a source of power (not shown) through a high frequency choke 78 and then connects through conductors 79 and 80 to the upper end of the coil 26. The plate 54 of the triode 42 is connected through the conductor 82 to a meter or control device and source of plate voltage (not shown). The control grid 48 is connected by means of the conductor 83 to the point 22 of the impedance bridge 10 whereby the signal on the grid 48 depends upon the unbalance of the bridge 10.

The triode 42 may be biased in the same manner as the triode 42 in Figure 1 so as to pass a certain amount of current when there is no ice present on the pick-up unit 11. This system will respond to the unbalance of the impedance bridge 10 in exactly the same manner as described in connection with Figure 1.

Figure 3 discloses a modification of my invention which is similar to that disclosed in Figure 2 except that it has an additional tube which acts to detect bridge voltages due to bridge unbalance which have one phase relationship with respect to the oscillator voltage and which remains insensitive to voltage having a different phase relationship. The impedance bridge 10 is exactly the same as the impedance bridge 10 of Figure 2. This bridge 10 is powered by the coil 26 which is in the plate circuit of the triode 31 in the same manner as disclosed in connection with Figure 2. The system receives power through a conductor 100 which connects to a source of power not disclosed and which feeds power to the system through a high frequency choke 101. Thus, the bridge 10 acts as a combined bridge and oscillator circuit and cooperates with the coil 26 and triode 31 to form a complete oscillator, these parts being exactly the same as shown in connection with Figure 2. Thus, a further description of these parts plus their function is not believed necessary.

This system is provided with an additional vacuum tube in the form of a duo diode as shown at 103. The two plates 104 and 105 are connected together by the conductors 106 and 107 which are in turn connected to the plate of the triode 31 by means of conductors 108, 109, condenser 110 and conductors 111 and 112. The cathode 114 of the diode 115 is grounded as shown at 116 and is connected to the junction of conductors 108 and 109 by means of the resistance 117. The diode 115 operates through the resistance 117 and ground connection 116 to automatically bias the plate 105 of the diode 118 negatively. This is true because, when the plate 104 is positive with respect to the cathode 114, electrons pass freely from the cathode to the plate to charge the right-hand plate of the condenser 110 negatively, and when the plate 104 is negative with respect to the cathode 114 the tube is non-conductive and the electrons must leak through the resistance 117 to get to ground. It is obvious therefore that electrons may pass more freely through the tube to the plate 104 and the right-hand plate of condenser 110 than they can pass therefrom through the resistance to ground. Hence, a negative charge is built up on the right-hand plate of the condenser 110 and the plate 105 of the diode 118 is biased negatively by an amount proportional to the peak voltage of the oscillator. Thus, as an alternating voltage is applied to the condenser 110 by the oscillator triode 31 the plates 104 and 105 will oscillate between a potential approximately equal to ground potential and a potential below ground potential. The voltage curve representing the potential of the plates 104 and 105 with respect to ground is approximated by the solid line curve 122 in Figure 4, the straight line G—G representing ground potential. This is actually the voltage wave of the oscillator with its axis shifted negatively so that its most positive potential is approximately at ground potential. It is obvious that the diode 118 could be biased positively instead of negatively if the cathodes and plates were interchanged in each of the diodes.

The cathode 120 of the diode 118 is connected by conductor 123 to the point 22 of the impedance bridge 10. Thus, when the impedance bridge is balanced, the point 22, and hence the cathode 120, will be at ground potential. When the bridge is unbalanced the potential of the point 22 will alternately pass above and below ground potential due to the alternating current flowing around the bridge 10. Thus the potential of the cathode 120 will also pass alternately above and below ground potential. The coils 18, 19 and 26 are so wound that when the bridge 10 is unbalanced by the polarization or dielectric effect of ice forming on the pick-up unit 11, thereby weakening the electric field between the plates of the condenser 12 and hence increasing the capacity thereof, the potential of the point 22 and cathode 120 will vary along a wave which is nearly 180 degrees out of phase with the wave formed by the potential on the plate 105. This wave form which the potential of the cathode 120 takes when the bridge is unbalanced by ice is shown in the solid line 124 in Figure 4. It can be seen in Figure 4 that the two waves 122 and 124 overlap when the wave 122 is near its peak and when the wave 124 is near its minimum value. Where these waves overlap the plate 105 is at a higher absolute potential than the cathode 120 and therefore the diode 118 will pass current. It will be seen further that the amount of current passed by the diode 118 will depend upon the amplitude of the wave 124 which in turn depends upon the amount of unbalance of the bridge 10 as caused by the formation of ice on the pick-up unit. Thus, the diode 118 passes a current, the magnitude of which depends upon the thickness of the ice formation on the pick-up unit 11.

The impedance bridge 10 is also unbalanced as a result of the conductance effect of the ice. The conductivity effect is explained in the "Standard Handbook For Electrical Engineers" as follows:

"An imperfect condenser, that is, one which shows a loss of power from one cause or another, can sometimes be replaced for purposes of calculation by a perfect condenser with an ohmic conductance shunted around it. This conductance, or 'leakance,' as some authors call it, is selected of such a value that the I²R loss in it is equal to the loss of power from all causes in the given imperfect condenser. The actual current through the imperfect condenser is considered then as consisting of two components—the leading reactive component through the ideal condenser, and the loss component, in phase with the voltage, through the shunted conductance." (Sec. 2, paragraph 140.)

In icing, the conductance effect is dependent upon the thickness of the ice formation, and varies greatly with the temperature of the ice and therefore cannot be used as a reliable criterion of its thickness. If the bridge 10 were unbalanced solely due to the effect of the conductance of the ice, then the absolute potential of the point 22 and of the cathode 120 would vary according to a wave form which is 90 degrees out of phase with the wave form 124 shown in Figure 4. This wave form which results from the conductance effect of the ice is shown in the dotted line indicated at 126. This wave form being 90 degrees out of phase with the wave 122 does not cause the diode 118 to conduct an appreciable amount of current for the reason that the two wave forms 126 and 122 will not overlap to any substantial degree.

Actually of course, the potentials of the point 22 and of the cathode 120 will not vary in accordance with the two separate wave forms 124 and 126 but does vary in accordance with the sum of these two wave forms. The effect is the same however in that the resultant operation of the diode 118 will depend upon the amount of bridge unbalance which is due to the change in the capacity of the condenser 12 and which is independent of the conductance effect of the ice formation. Thus, this system takes advantage of the phase displacement between the bridge unbalance caused by a change in capacity of the condenser 12 and that caused by the conductance of the ice.

Not only is it possible to substantially eliminate the effect of the conductance of the ice with its undesirable temperature coefficient, but this effect can actually be used to improve the accuracy of the capacity measurement. By suitably changing the phase of the bridge output with respect to the oscillator voltage, the conductance can be made to act negatively, that is, to oppose part of the dielectric effect caused by temperature changes. Only a small amount of this opposing action need be used to compensate the smaller temperature coefficient of the dielectric constant of ice. The result is that a given thickness of ice will produce approximately the same thickness indication regardless of temperature.

The operation of this system can be explained in a slightly different manner in connection with Figures 5 and 6. Figure 5 is a vector diagram in which the vector 150 represents the voltage on the plate 105, this voltage being proportional to the oscillator voltage. The vector 151 represents the voltage on the cathode 120 which has been shown in this case as slightly less than 180 degrees out of phase with the voltage on the plate 105. The current flow through the diode 103 is dependent upon the voltage difference between the plate and cathode, and therefore the vector 151, which is actually a negative value, is shown as added to the vector 150. This vector 151 represents the voltage on the cathode 120 which is caused only as a result of a change in capacity in the condenser 12.

As stated above the conductance effect of the ice causes a bridge unbalance which results in a voltage wave which is 90 degrees out of phase with the voltage produced by a change in the capacity of the condenser 12. This effect is illustrated by the vector 152. The phase relationship between the vectors 151 and 150 and between 152 and 150 may be controlled by varying certain constants of the system, namely the condenser 110, resistance 24 and resistance 117. The vector 152 is always 90 degrees out of phase with vector 151, however. Where the point 153 at the end of the vector 152 is brought directly on the circle 154 formed by rotating the vector 150, then the effect of the conductance of the ice is completely eliminated for that particular value of ice thickness and temperature.

In Figure 6, the wave forms produced by the various voltage vectors have been drawn. The solid line wave 158 is the wave formed by the voltage vector 150 which represents the voltage on the plate 105. This wave does not cross the horizontal line 160, which represents the bias across the diode 118, and hence will not cause the tube to conduct current. Dotted line 162 represents the wave formed by a vector which is the sum of vectors 150 and 152 and represents the wave form which would result if the bridge were unbalanced only as a result of the effect of the conductance of the ice. This does not cross line 160 and hence the tube will not conduct current due to the conductance effect of the ice alone. The dotted line wave 159 is that formed by the sum of the vectors 150 and 151. As stated above, the horizontal line 160 indicates the bias across the diode 103, that is, the diode will be conducting only when the voltage wave passes above this line. Thus, the area bounded by the horizontal line 160 and the peak of the voltage wave 159 represents the amount of current which would be passed by the diode as a result of bridge unbalance due entirely to a change in the capacity of the condenser 12. The solid line wave 161 is that wave formed by rotation of the voltage vector 156 which is the wave form which results from a condition in which the bridge is unbalanced as a result of a change in the capacity of the condenser 12 and also an unbalance due to the conductance effect of the ice. This, of course, is the condition which actually exists during the operation of the system. It will be seen that the area bounded by the horizontal line 160 and the peak of the voltage wave 161 is the same as the previously defined area formed by the line 160 and the voltage wave 159, thus indicating that the diode will pass the same amount of current in each case. Thus, the effect of the conductance of the ice is entirely eliminated for this particular value of ice thickness and temperature, and approximately for other values as long as the vectors 151 and 152 do not become too large with respect to vector 150.

Actually, it is desirable to bring the point 153 slightly inside of the circle 154 so that the conductance of the ice will have the effect of decreasing the amount of current passed by the diode for the purpose of compensating for the effect of temperature upon the dielectric constant of the ice. In this manner, the system may be made to function substantially independently of the effect of temperature changes upon the conductance and dielectric constant of the ice.

The above system compensates for the effect of temperature upon the electrical properties of the ice only, and the temperature compensating condenser is still desirable for compensating for the effect of temperature upon the electrical properties of the materials used in the bridge circuit.

When the plate 105 of the diode 118 is positive with respect to the cathode 120, the diodes will be rendered conducting which means that electrons will pass from the cathode 120 to the plate 105. This builds up a positive potential on the cathode 120 which is fed back through the conductors 123, 128, choke coil 129 and conductor 130 to the control grid 131 of the detector triode 132. The control grid 131 is biased by means of the grid leak resistor 134 which extends to ground and by the voltage applied to the cathode 136. A by-pass condenser 135 is also provided for by-passing any high frequencies which may get past the choke coil 129. The cathode 136 is connected by means of the conductor 137 to a suitable source of biasing potential. The plate 138 is connected by means of a conductor 139 to an indicating meter 140, and thence by conductor 141 to a suitable source of plate voltage (not shown).

Thus, when the diode 118 is rendered conducting and the positive potential built up on the cathode 120 feeds back into the control grid 131 of the detecting triode 132, a current is passed thereby to the plate circuit and to the indicating meter 140. The scale of the meter may be so calibrated as to indicate the thickness of ice formation on the pick-up unit 11.

It may be desirable to have the diode 118 and a triode 132 conduct a slight amount of current when there is no ice formation on the pick-up unit 11 so that as soon as power is supplied to the system as a whole the needle 142 of the meter 140 will move from the "off" position to the "0" or "no ice" position. This also gives the person using the system an indication as to whether or not the system is in operation, regardless of whether or not there is any ice forming on the pick-up unit 11.

Reference numeral 144 indicates a manual key which may be used for determining whether or not the impedance bridge 10 is in proper alignment.

The present system has been described in combination with a pick-up unit for detecting the thickness of ice formation, but as stated above, the system itself is of general application and may be used for detecting and amplifying various types of variable conditions. It will also be possible under certain conditions to vary the inductance of one of the coils 18 or 19 instead of varying the capacity of the condensers 12 and 13 for unbalancing the impedance bridge 10. Although a twin triode tube and a twin diode tube are used, it will be obvious that separate tubes may be used in each case if desired. Various other changes and modifications will undoubtedly occur to those who are skilled in the art, and we therefore wish it to be understood that we intend to be limited only by the scope of the appended claims and not by the specific embodiments of our invention which have been disclosed for the purposes of illustration only.

While it is obvious that various different values may be used and properly balanced to make the system operate in the proper manner, we have found that one set of values which give very satisfactory results in the systems disclosed in Figures 2 and 3 are listed below:

Inductance coils 18, 19 and 26—2,000 turns each #39 SE having an inductance of 50 millihenries.
Choke coils 78 and 101—3,000 turns each #39 SE.
Condensers 73, 71—.0001 microfarad.
Condenser 74—.0003 microfarad.
Condenser 110—.00001 microfarad.
Condenser 135—.002 microfarad.
Resistances 24, 134, 117—.05 megohm ½ watt.
Conductor 77 should be connected to 125 volts.
Conductor 82 and conductor 139 should be connected to 125 volts.
Cathode 136 should be connected to a 10 to 15 volt bias.
The pick-up and compensating condensers should be about 50 microfarads including the cable connecting the unit to the bridge.
The duo triode tube may be a 7N7 and the duo diode may be a 7A6 for the system shown in Fig. 3.
The duo triode for the system shown in Fig. 2 may be a 14N7.

We claim as our invention:

1. An electrical circuit arrangement comprising in combination, a variable impedance bridge including inductance means and capacitance means, a coil inductively associated with said inductance means for supplying power thereto, a triode comprising cathode, grid and plate, means for connecting one end of said coil to said plate, means connecting said plate to a source of unidirectional voltage, a feed back connection from the other end of said coil to said grid to cause said bridge and triode to function as an oscillator and cause alternating current to flow in said bridge, a second triode having a cathode, grid and plate, said bridge having a point whose potential does not vary when said bridge is balanced but which alternately increases and decreases due to the flow of alternating current when said bridge is not in balance, and means connecting said point to the grid of said second triode to cause a flow of electrons from said cathode to said plate in accordance with the amount of bridge unbalance.

2. An electrical circuit arrangement comprising in combination, a combined variable impedance bridge and oscillator including capacitance and inductance means connected in parallel, a coil inductively associated with said inductance means, electron discharge means having a plate and control grid, a source of plate voltage connected to said plate, means connecting said plate to said coil, a feed back connection to said grid whereby alternating current is caused to flow in said bridge, said bridge having a point whose potential remains constant when said bridge is in balance but whose potential increases and decreases due to the flow of alternating current when said bridge is unbalanced, a diode comprising a plate and cathode, means connecting the plate of said diode to the plate of said electron discharge means, means connecting the cathode of said diode to said point on said bridge, and means biasing said diode whereby it passes substantially no current when said bridge is balanced, said last named means including a second diode having a plate connected to the plate of said first diode and a cathode, means connecting the cathode of the second diode to ground, means including a resistance element connecting the cathode of the second diode to the plates of both diodes, and a condenser connected between the plates of said diodes and the plate of said electron discharge means, the voltage on the cathode of said diode being substantially 180° out of phase with the voltage on said plate where said cathode voltage results from bridge unbalance due to a change in inductance or capacitance, and 90° out of phase with the voltage on the plate of said diode where said cathode voltage results from bridge unbalance due to change in the conductance of said bridge.

3. An ice indicator system comprising in combination, a variable impedance bridge including inductance means and variable capacitance means, said variable capacitance means including a pick-up unit comprising a condenser whose capacity is varied as a result of the formation of ice upon said unit, a coil inductively associated with said inductance means, electron discharge means having a cathode, plate and control grid, means connecting said plate to a source of plate voltage, means connecting said plate to said coil, a feed back connection to said grid whereby an alternating current is induced in said bridge, said bridge having a point whose potential remains constant when said bridge is balanced and whose potential increases and decreases due to the flow of alternating current in said bridge when said bridge is unbalanced, a diode comprising a plate and cathode, means connecting the plate of said diode to the plate of said electron discharge means, means connecting the cathode of said diode to said point on said bridge, and means biasing said diode whereby it passes substantially no current when said bridge is balanced, the voltage on the cathode of said diode being substantially 180° out of phase with the voltage on said plate where said cathode voltage results from bridge unbalance due to a change in capacitance of said pick-up condenser, and 90° out of phase with the voltage on the plate of the diode where the cathode voltage results from bridge unbalance due to the conductance of the ice on said pick-up condenser.

4. An ice indicator system comprising in combination, a variable impedance bridge including inductance means and variable capacitance means, said variable capacitance means including a pick-up unit comprising a condenser whose capacity is varied as a result of the formation of ice upon said unit, a coil inductively associated with said inductance means, electron discharge means having a cathode, plate and control grid, means connecting said plate to a source of plate voltage, means connecting said plate to said coil, a feed back connection to said grid whereby an alternating current is induced in said bridge, said bridge having a point whose potential remains constant when said bridge is balanced and whose potential increases and decreases due to the flow of alternating current in said bridge when said bridge is unbalanced, a diode comprising a plate and cathode, means connecting the plate of said diode to the plate of said electron discharge means, means connecting the cathode of said diode to said point on said bridge, and means biasing said diode whereby it passes substantially no current when said bridge is balanced, the voltage on the cathode of said diode being substantially 180° out of phase with the voltage on said plate where said cathode voltage results from bridge unbalance due to a change in capacitance of said pick-up condenser, and slightly less than 90° out of phase with the voltage on the plate of the diode where the cathode voltage results from bridge unbalance due to the conductance of the ice on the pick-up condenser, whereby the conductance of the ice will have sufficient effect upon the amount of current passed by the diode to compensate the system for the effect of temperature on the dielectric constant of ice.

5. An electrical circuit arrangement comprising, in combination, a variable impedance bridge, means supplying alternating current to said bridge, the impedance of at least one arm of said bridge being variable in response to a condition, said impedance variation having components of conductance and reactance, said variation causing unbalance of said bridge whereby to cause the appearance of a signal potential in the output of said bridge, means connected to said bridge output for giving a response to said signal potential substantially unaffected by the conductance component of said impedance variation, said last mentioned means comprising an electron discharge device including means whereby the flow of current through said device may be regulated by varying a control potential, further means for applying a control potential to said regulating means, said further means including first electric discharge means arranged to selectively permit and interrupt the passage of control potential to said regulating means in accordance with the relation between a plurality of electrical potentials, and second electronic discharge means arranged to cooperate with said source of alternating current for said bridge to vary the relation between said plurality of electrical potentials.

6. In a device of the class described, a first source of alternating current of a selected frequency, a second source of alternating current having components of said frequency, but mutually displaced in phase by approximately ninety degrees, a first of said components being in phase with the current from said first source, first electron discharge means having an anode, a cathode, and a control electrode for regulating the flow of current through said means in accordance with variation in a control potential applied between said cathode and said control electrode, means maintaining said anode at a higher positive potential than said cathode, and means operatively connecting said source with said control electrode and said cathode for varying said control potential in accordance with the magnitude of said first component of said alternating current from said second source, said control potential being substantially unaffected by the magnitude of the displaced component of said alternating current, said connecting means comprising a pair of impedance members, first terminals of said impedance members being connected together and to said control electrode, said impedance members being connected in series across said second source of alternating current, at least one of said impedance members having different values of impedance to currents of different frequencies, directionally selected electrical conducting means in a series circuit with said second source of alternating current and said impedance members, said series circuit including further means providing potential to oppose the flow of current to said members in said selected direction.

7. An ice indicator comprising an electric bridge, one of the arms of said bridge being variable in capacitance and in conductance in response to a condition, a first source of alternating current of a selected frequency to energize said bridge, means connected in the output of said bridge whereby unbalance of said bridge may provide a source of alternating current having components of said frequency but mutually displaced in phase by approximately ninety degrees, a first of said components being in phase with the current from said first source, first electron discharge means having an anode, a cathode, and a control electrode for regulating the flow of current through said means in accordance with variation in a control potential applied between said cathode and said control electrode, means maintaining said anode at a higher positive potential than said cathode, and means operatively connecting said source with said control electrode and said cathode for varying said control potential in accordance with the magnitude of said first component of said alternating current from said second source, said control potential being substantially unaffected by the magnitude of the displaced component of said alternating current, said connecting means comprising a pair of impedance members, first terminals of said impedance members being connected together and to said control electrode, said impedance members being connected in series across said second source of alternating current, at least one of said impedance members having different values of impedance to currents of different frequencies, directionally selected electrical conducting means in a series circuit with said second source of alternating current and said impedance members, said series circuit including further means providing potential to oppose the flow of current to said members in said selected direction.

8. An electrical circuit arrangement comprising in combination, a variable impedance bridge including inductance means and capacitance means, a coil inductively associated with said inductance means for supplying power thereto, a triode comprising cathode, grid and plate, means for connecting one end of said coil to said plate and the other to a source of D. C. potential, a feedback connection from said bridge to said grid to cause said bridge and triode to function as an oscillator and cause alternating current to flow in said bridge, a second triode having a cathode, grid and plate, said bridge having a point whose potential does not vary when said bridge is balanced but which alternately increases and decreases due to the flow of alternating current when said bridge is not in balance, and means connecting said point to the grid of said second triode to cause a flow of electrons from said cathode to said plate in accordance with the amount of bridge unbalance.

9. An electrical circuit arrangement comprising in combination, a variable impedance bridge, means causing an alternating current to flow in said bridge, said bridge having points which remain at the same potential when said bridge is balanced, but between which there appears, when said bridge is unbalanced, an alternating voltage whose amplitude and phase are determined by the reactance and resistance changes bringing about said unbalance, indicating means electrically connected to said points for responding to said alternating voltage, and means reducing the relative effectiveness, upon said indicating means, of change in the resistive components of bridge unbalance as compared to change in the reactive component thereof, said last named means including an automatically biased diode comprising a plurality of control elements including a cathode and a plate, one of said elements being connected to said point on said bridge.

10. An electrical arrangement comprising in combination: a variable impedance bridge having capacitive arms and inductive arms; an electronic oscillator including an electron discharge device, having a cathode, a plate, and a control electrode, and a resonant circuit, having inductive and capacitive elements; an inductor having a plurality of windings which comprise said inductive arms and said inductive elements, said inductor serving to energize said bridge from said oscillator; said bridge having a point whose potential remains constant when said bridge is in balance but whose potential increases and decreases due to the flow of alternating current when said bridge is unbalanced; a diode comprising a plate and cathode; means connecting the plate of said diode to the plate of said electron discharge device; means connecting the cathode of said diode to said point on said bridge; and means, independent of said bridge, deriving from the output of said oscillator a voltage for biasing said diode to pass substantially no current when said bridge is balanced, the voltage on the cathode of said diode being substantially 180° out of phase with the voltage on said plate where said cathode voltage results from bridge unbalance due to a change in inductance or capacitance, and 90° out of phase with the voltage on the plate of said diode where said cathode voltage results from bridge unbalance due to change in the conductance of said bridge.

11. An ice indicator system comprising in combination, a variable impedance bridge including inductance means and variable capacitance means, said variable capacitance means including a pick-up unit comprising a condenser the resistive and reactive components of whose impedance vary as a result of the formation of ice upon said unit, a source of alternating voltage of a selected frequency, means inductively energizing said bridge from said source, said means including said inductance means in said bridge, said bridge having a point whose potential remains constant when said bridge is balanced and whose potential increases and decreases due to the flow of alternating current in said bridge when said bridge is unbalanced, and means connected to said point for responding to said alternating voltage, and means reducing the relative effectiveness, upon said indicating means, of change in the resistive impedance of said pick-up condenser as compared to change in the reactive impedance thereof, said last mentioned means including electron discharge means deriving a second potential from said source and further means combining said second potential with said bridge potential.

12. An electrical circuit arrangement comprising, in combination, a variable impedance bridge, a source of alternating voltage for said bridge coupled thereto, the impedance of at least one arm of said bridge being variable in response to a condition, said impedance variation having components of conductance and reactance, said variation causing unbalance of said bridge whereby to cause the appearance of a signal potential in the output of said bridge, means connected to said bridge output for giving a response to said signal potential, and means inhibiting response to the conductance component of said impedance variation, said last named means comprising a diode, means for applying across said diode a varying unidirectional voltage derived from said source, and means for applying across said diode a voltage appearing in the output of said bridge.

13. An electrical circuit arrangement comprising, in combination, a variable impedance bridge, a source of alternating voltage for said bridge coupled thereto, the impedance of at least one arm of said bridge being variable in response to a condition, said impedance variation having components of conductance and reactance, said variation causing unbalance of said bridge whereby to cause the appearance of a signal potential in the output of said bridge, means connected to said bridge output for giving a response to said signal potential substantially unaffected by the conductance component of said impedance variation, said last mentioned means comprising an electron discharge device including means whereby the flow of current through said device may be regulated by varying a control potential, and further means for applying a control potential to said regulating means, said last named means comprising a diode, means for applying across said diode a varying unidirectional voltage derived from said source, and means for applying across said diode a voltage appearing in the output of said bridge.

14. In a device of the class described, a source of alternating current having components of a selected frequency mutually displaced in phase, electron discharge means having an anode, a cathode, and a control electrode for regulating the flow of current through said means in accordance with variation in a control potential applied between said cathode and said control electrode, means maintaining said anode at a higher positive potential than said cathode, means operatively connecting said source with said control electrode and said cathode for varying said control potential in accordance with the magnitude of said first component of said alternating current, and means inhibiting variations of said control potential by other components of said alternating current, said last named means comprising a diode, means for applying across said diode a varying unidirectional voltage derived from said source and means for applying across said diode a voltage appearing in the output of said bridge.

15. An ice indicator comprising an electric bridge, alternating current means for energizing said bridge, one of the arms of said bridge being variable in capacitance and conductance in response to a condition, whereby to affect the balance of said bridge to provide a source of alternating current having components of a selected frequency mutually displaced in phase, electron discharge means having an anode, a cathode, and a control electrode for regulating the flow of current through said means in accordance with variation in a control potential applied between said cathode and said control electrode, means maintaining said anode at a higher positive potential than said cathode, means operatively connecting said source with said control electrode and said cathode for varying said control potential in accordance with the magnitude of said first component of said alternating current, and means inhibiting variation of said control potential by other components of said alternating current, said last named means comprising a diode, means for applying across said diode a varying unidirectional voltage derived from said source, and means for applying across said diode a voltage appearing in the output of said bridge.

16. A device for indicating accretion of ice on a surface comprising a pickup varying in capacitive and conductive impedance with accretion of ice thereupon, electrical means responsive to variations in the impedance of said pick-up, and electron discharge means inhibiting the response of said responsive means to variation in the conductive component of the impedance of said pickup.

17. A device for indicating accretion of ice on a surface comprising a pickup varying in capacitance and conductance with accretion of ice thereupon, an electric bridge, said pickup comprising an arm of said bridge, electric means for responding to unbalance of said bridge caused by variation in the capacitance and conductance of said pickup, and electron discharge means electrically associated with said detecting means for inhibiting the response of said means to variations in the conductance of said pickup.

WALDO H. KLIEVER.
RICHARD M. FRANZEL.

REFERENCES CITED

The following references are of record in the file of this patent:

UNITED STATES PATENTS

| Number | Name | Date |
|---|---|---|
| 2,190,488 | Schnoll | Feb. 13, 1940 |
| 2,111,786 | Knight | Mar. 22, 1938 |
| 2,146,073 | Jennens et al. | Feb. 7, 1939 |
| 2,217,797 | Donovan, Jr. | Oct. 15, 1940 |
| 2,237,254 | Broekhuysen | Apr. 1, 1941 |
| 2,316,875 | Laboulais | Apr. 20, 1943 |
| 2,043,241 | Eyer | June 9, 1936 |
| 2,103,741 | Bencowitz | Dec. 28, 1937 |
| 2,127,823 | Leifheit | Aug. 23, 1938 |
| 2,271,292 | Fisher | Jan. 27, 1942 |

FOREIGN PATENTS

| Number | Country | Date |
|---|---|---|
| 243,318 | British | Dec. 20, 1926 |
| 609,661 | German | Feb. 19, 1935 |

OTHER REFERENCES

A. C. Bridge Methods, Hague, 1938, pp. 238–241, including Fig. 89 (Div. 48).